United States Patent [19]

Groff

[11] 4,082,244
[45] Apr. 4, 1978

[54] COUNTERBALANCING SUPPORTING DEVICE

[76] Inventor: Leroy K. Groff, 3115 Oakland Shores Dr., Fort Lauderdale, Fla. 33309

[21] Appl. No.: 737,327

[22] Filed: Nov. 1, 1976

[51] Int. Cl.$^2$ .............................................. A47F 5/10
[52] U.S. Cl. ................................................. 248/280
[58] Field of Search ............... 248/280, 292, 297, 284, 248/123, 162; 240/69

[56] References Cited

U.S. PATENT DOCUMENTS

| 906,874 | 12/1908 | Hallowell | 248/280 |
|---|---|---|---|
| 1,864,756 | 6/1932 | Pieper | 248/280 |
| 2,700,524 | 1/1955 | Lauterbach | 248/280 |
| 2,941,776 | 6/1960 | Lauterbach | 248/284 |
| 3,433,444 | 3/1969 | Smith | 248/280 |

FOREIGN PATENT DOCUMENTS

| W14402 | 8/1956 | Germany | 248/292 |
|---|---|---|---|
| 785,363 | 10/1957 | United Kingdom | 248/280 |
| 1,111,294 | 4/1968 | United Kingdom | 248/280 |

Primary Examiner—Marion Parsons, Jr.
Attorney, Agent, or Firm—Malin & Haley

[57] ABSTRACT

A device for supporting an object such as a dental x-ray unit on the free end of a vertically pivotal arm, which allows the object to be counterbalanced for stabilized vertical positioning. The supporting device includes a rigid tubular encasement having a pair of articulating knuckles pivotably attached at each end of the encasement, and a counterbalancing mechanism disposed within the encasement and connected at each end to the articulating knuckles, the counterbalancing mechanism including a compression spring having a force adjustment means, a rod disposed through said spring which includes a threaded fastener which engages one end of the compression spring, and linkage arms at each end connecting the rod to the articulating knuckles. The device is characterized by a readily accessible spring tension adjustment allowing job site adjustment to compensate for spring fatigue, improved efficiency and reduced costs resulting from a reduced number of operating parts, and improved operability.

6 Claims, 5 Drawing Figures

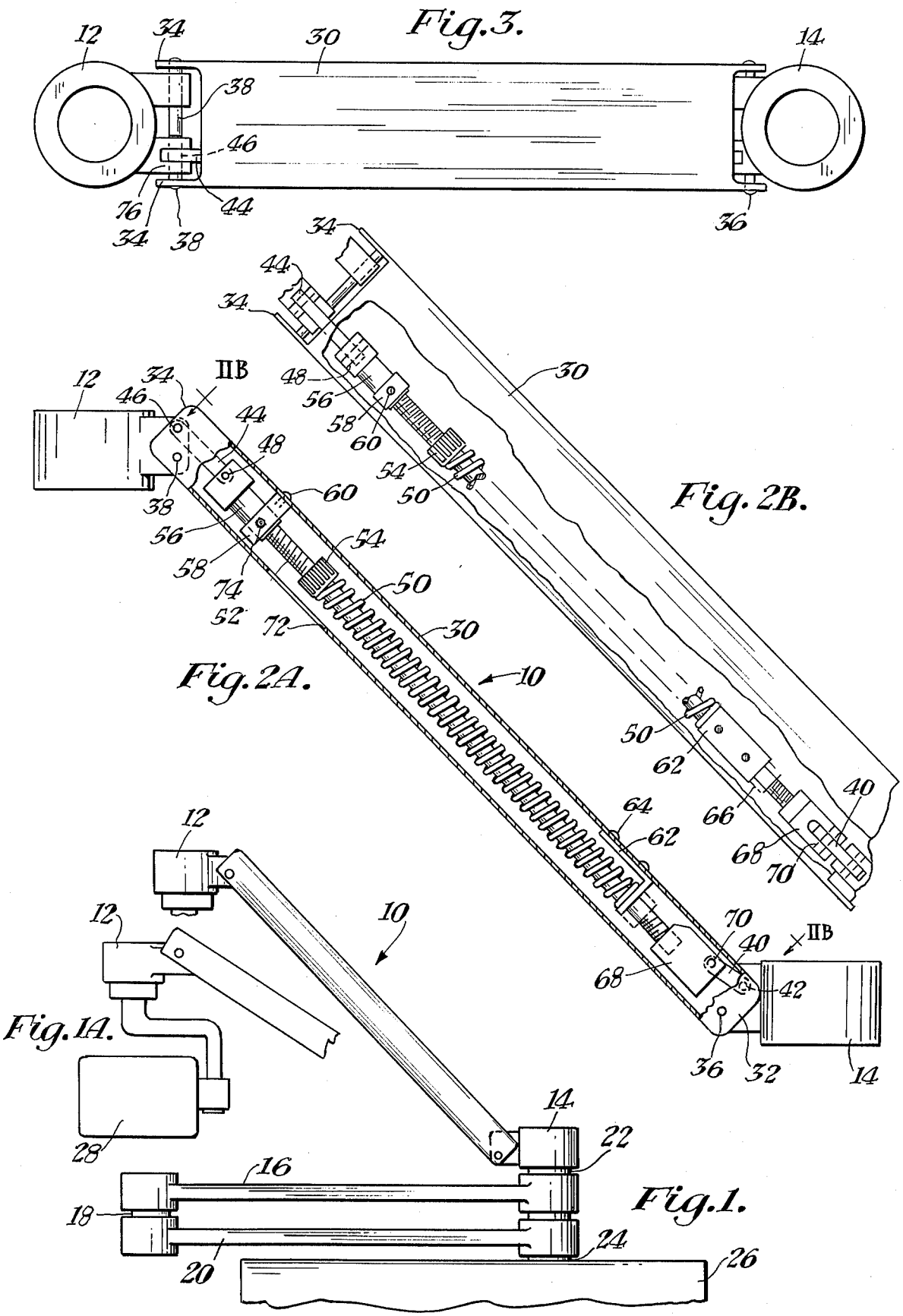

COUNTERBALANCING SUPPORTING DEVICE

BACKGROUND OF THE INVENTION

This invention relates generally to a counterbalanced or counterpoised supporting arm, which is utilized to support a particular object on the free end of an arm and permit vertical adjustment of the supported object. The instant invention is extremely useful for supporting a dental x-ray unit which must provide some vertical position adjustment for extraoral movement relative to the patient but provide extreme stability once it is positioned for allowing the x-ray to be taken. Other uses could be stabilization of lamps, tables, television sets and the like which require adjustable, stabilized vertical positioning.

The prior art shows a plethora of counterbalanced support arms which have been complex in construction and operation. One such counterbalancing mechanism is shown in U.S. patent 2941776 issued to N. E. Lauterbach which shows an outer tubular support arm having a spring encased with a second tube, the device including fixed linkage arms attached to end supporting devices. One of the drawbacks of the Lauderbach device is the complexity of construction and spring tension adjustment. Many of the other devices shown in the prior art utilize cables and counter weights and elaborate spring counter weight systems to achieve the counterbalancing of the arm. Other drawbacks in the prior art devices include the limitations placed on the angular travel of the arm due to the particular type of mechanism employed.

With regard to overall supporting arm mechanisms especially in the dental field, many offices today have relatively low ceiling heights which make impractical devices shown in the prior art which in effect are jointed vertical support arms which in order to store vertically require high ceilings for storage. Utilizing the instant invention in conjunction with a plurality of rigid horizontally movable arms, a dental x-ray unit can be conveniently stored against the wall or the like and extended horizontally with the final vertical position being achieved by the counterbalancing mechanism of the instant invention.

The instant invention also provides for a readily lockable device which may lock the arm in a fixed position, a feature not shown in the prior art.

BRIEF DESCRIPTION OF THE INVENTION

A vertically positionable, counterbalanced supporting arm for supporting an object while providing for vertical adjustment and positioning of the object, the device comprising a rigid, tubular, elongated encasement, a pair of articulated knuckles, one connected at opposite ends of said encasement, each of said knuckles being pivotally connectable by a bearing pin to said encasement sidewalls, and a counterbalancing means adjustably disposed and connected between said knuckles to fix said knuckles in fixed parallel planes regardless of the movement of said arm. The counterbalancing tensioning means includes a threaded rod, a compression spring disposed around said rod, a spring brace connected to the inside of said casement and engaging one end of said spring to provide a spring stop, and linkage means at each end connecting the knuckles to the rod and the spring. Adjacent one end of the encasement and disposed therein is a clevis bearing which is fixed to the inner wall of the encasement which receives a clevis therein connected pivotally to a linkage arm fixed to one point on the articulated knuckle at one end. At the opposite end, a main block is threadably connected to said rod and includes an identical linkage arm pivotally connected to the opposite articulated knuckle. A tensioning nut is disposed at the opposite end of said spring and is connected to said threaded rod to allow for adjustment of tension on the compression spring. The encasement includes an aperture which allows access to the tensioning nut such that the tension on the spring can be adjusted by a tool received through the encasement aperture.

The device may include a stop and locking mechanism to lock the device in a particular position by providing the clevis bearing which is fixed to the inner wall of the encasement with a threaded locking nut or the like which could engage the clevis by threaded rotation to stop the clevis in a particular position.

The overall operation of the counterbalancing mechanism is achieved by establishing a force vector parallelogram with the rigid encasement being one long leg of the parallelogram and the inner compression spring mechanism being the other and achieving the proper weight balance which is the function of the weight of the object placed on the free end of the knuckle. The articulate knuckles are mechanically connected to move together by the linkage arms which are tied to threaded connecting rods. The movement of the rod however is tensioned against the compression spring which thus allows it to provide a resistive force to the weight of the object being supported which can be balanced by adjustment of the total tension force on the spring acting and pushing against or resisting the motion of the rod in a direction which tends to rotate the object supporting knuckle.

In one embodiment the device is employed in conjunction with a plurality of horizontally disposed arms which may be fastened to a wall mounted unit to provide extendable horizontal support from a vertical wall surface. The arms are pivotally connected to allow horizontal movement of the entire supporting system from a wall which allows for storage against the wall when the device is not in use and extension with very little vertical displacement when the device is being used. The counterbalancing mechanism is pivotally fixed to the free end of the horizontally extended arm, thus providing necessary vertical adjustability when utilizing the device in conjunction with a dental x-ray unit.

Once a dental x-ray unit is connected to the object supporting articulated knuckle at the free end of the counterbalancing mechanism, the counterbalancing mechanism may be vertically positioned to maintain vertical position with approximately a $+15°$ above to a $-30°$ below angular arm movement. The counterbalanced arm of the instant invention may be rotatably attached to an adjacent horizontal supporting arm and rotated 360° around its attaching knuckle.

It is an object of this invention to provide an improved counterbalancing device used to support an article, the device providing stabilized, vertical positioning while allowing utility in any particular room regardless of the ceiling height.

And yet another object of this invention is to provide a counterbalanced, vertically adjustable and movable supporting arm for an article which may be readily adjusted for tensioning the arm to compensate for spring fatigue.

But yet still another object of this invention is to provide an improved, counterbalanced supporting arm which is non-complex in construction and operation, reducing overall installation and operational costs.

And still yet another object of this invention is to provide a vertically movable counterbalanced article supporting arm which may be readily locked in a fixed position.

In accordance with these and other objects which will be made apparent hereinafter, the instant invention will now be described with particular reference to the accompanying drawings.

BRIEF DESCRIPTION OF THE DRAWINGS

FIG. 1 shows a front elevational view of the instant invention utilized with a dental unit supporting arm that is horizontally extendable from a wall mounted unit.

FIG. 1A shows a fragmentary view of a portion of the instant invention connected to a conventional x ray unit at one end.

FIG. 2A shows a side elevational view of the instant invention partially cut away showing the interior mechanism of the invention.

FIG. 2B shows a top plan view of the instant invention as shown in FIG. 2A.

FIG. 3 shows a top plan view of the instant invention.

PREFERRED EMBODIMENT OF THE INVENTION

Referring now to the drawings and especially to FIG. 1, the instant invention is shown generally at 10 connected at one end to an articulated knuckle 12 and at its lower end to knuckle 14 which is rotatably connected by bearing 22 to a horizontally disposed supporting arm 16. Arm 16 is connected at one end by bearing 18 to a similar horizontally disposed arm 20 which is mounted on top of an operating box 26 and rotatably connected by bearing 24. The operating box 26 which may be a wall mounted unit is utilized for operating a conventional dental x ray device. FIG. 1A shows a conventional x ray head 28 mounted at one end of the instant invention to knuckle 12. The unit shown in FIG. 1 is advantageous for use in a room having a low ceiling since the arms 16 and 20 project horizontally from the wall while the device 10 provides for proper vertical positioning of the x ray unit 28 connected thereto.

Referring now to FIG. 2A, the instant invention is shown generally at 10 comprised of a rigid steel tubular encasement 30 connected at one end pivotably to articulated knuckle 14 by a pin 36 through bifurcated end panels 32. Connected at the opposite end in a similar manner is a knuckle 12 which is connected to bifurcated end panels 34 of encasement 30 by a pin 38.

The articulated knucles 12 and 14 are mechanically connected together by a rigid rod 52 having a threaded portion which is threadably connected to a main block 68 at one end and disposed through L-shaped brace 62 rigidly affixed to one inside wall of encasement 30 by a pair of bolts 64, the rod 52 being connected threadably at its opposite end to a clevis 56 which is received into a clevis bearing 58 rigidly fixed to encasement 30 by a pair of bolts 60. The clevis 56 is pivotally connected to linkage arm 44 by pin 48, the arm 44 being connected to knuckle 12 pivotably by pin 46. The main block 68 engaging one end of rod 52 is pivotably connected to knuckle 14 by linkage arm 40 by a pin 42 and pin 70 connected to the main block. A locking nut (dotted) 66 (FIG. 2) may be threadably coupled to rod 52 adjacent brace 62 and may be utilized for adjusting the linkage arm relative movement, but is not necessary for the operation of the instant invention.

The tensioning force utilized to counterbalance the weight of an article placed on knucle 12 is achieved by the compression spring 50 which is engaged at one end against brace 62 preventing downward motion of the spring and a star tensioning nut 54 threadably engaged to rod 52 at the upper end of spring 50. The tensioning nut 54 is located near an aperture 72 disposed in the bottom side of casement 30, the aperture 72 allowing access to tension nut 54 to provide for on-sight spring tensioning allowing for job sight adjustment of the counterbalancing force. A certain amount of spring fatigue is normal, which may be compensated for by rotational movement of the tensioning nut 54. Also accessible through aperture 72 is the clevis 56 and the clevis bearing 58. The bearing may include a locking bolt 74 which engages clevis 56 to prevent movement of the tensioning mechanism, locking the entire arm in a particular position. This could be utilized in a storage position to prevent accidental movement of the supported object or in other environments such as aboard ships or the like where it may be necessary to compensate for rolling movement of the ship.

In FIG. 2B it should be noted that the rod 52 and the entire mechanical tensioning device is disposed on one side of a longitudinal center line along the encasement 30. The purpose of this disposition is to allow for a duplicate mechanism as shown to be added on the opposite side of the longitudinal center line of the encasement to, in effect, double the weight holding capacity of the device. Also the encasement volume allows for the passage of electrical conduit and the like through the device without interferring in any way with the counterbalancing mechanism.

FIG. 3 shows the bifurcated ends 34 and 36 of the encasement 30 which form a space at each end to allow freedom of movement of knuckles 12 and 14. Pin 38 is received through the bifurcated sides 34 to allow pivotal coupling of the knuckle 12 to the encasement 30. The knuckle 12 includes a fork 76 to allow connection to linkage arm 44 by pin 46. The knuckles 12 and 14 are circular and receive circular bearings for mounting to, in the case of knuckle 12, the x-ray unit head itself and knuckle 14 to an adjacent horizontally disposed extension arm.

In operation, the device 10 is shown, in FIGS. 2A and 2B, ready for use, in which it can be pivoted with knuckle 14 remaining at a particular position while knuckle 12 can assume a vertical position with a particular article attached thereto. Once the device is moved to the particular vertical position desired, release of the device will allow the article to be stabilized firmly in that position. As shown in FIG. 2A, downward movement of knuckle 12 causes pivotal motion between knuckle 12 and the encasement 30 causing the rod 52 including the tensioning nut 54 to compress and push against spring 50 which provides the tensioning force to support the weight of the article and the device itself. Rotation of the locking nut 74 can also allow for locking of the rod 52 so that the entire counterbalancing mechanism remains fixed in space and cannot be moved. The locking means could be disposed through the bottom wall of the encasement and include a cross-bar outside the encasement for turning the threaded locking member to frictionally engage the clevis surface.

In summary, the counterbalancing mechanism is readily attachable at one end to horizontally extendable supporting devices and can firmly support an article such as a dental x-ray unit in counter balanced equilibrium while still providing for vertical adjustment. The device is readily adjustable in tensioning to compensate for spring fatigue or weight variations on-sight without having to disassemble the encasement in the entire device. Further, the device is characterized by having a reduced number of parts while including a locking feature for various mobile environments.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A counterbalanced article supporting device to provide vertical adjustment of the supported article which upon release provides a stabilized fixed position of the article comprising:

rigid, tubular encasement;

first and second knuckles pivotably connected to opposite ends of said encasement;

compression spring disposed within said encasement;

spring stop connected to one end of said spring and to said encasement;

a rod partially disposed within said spring;

a block threadably connected to one end of said rod;

a moveable first linkage arm pivotally connected at one end to said block and pivotally at its opposite end to said first knuckle;

a clevis threadably connected to the opposite end of said rod;

a clevis bearing coupled to said clevis and connected to said encasement;

a movable second linkage arm pivotally connected at one end to said clevis and pivotally to said second knuckle at its opposite end;

adjustable spring tensioning means connected to said rod and engaging one end of said spring;

said encasement having an aperture in close proximity to said tensioning means, whereby said tensioning means is adjustably accessible from outside said encasement.

2. A counterbalanced article supporting device, as in claim 1, including:

locking means connected to said clevis for locking said tubular encasement in a fixed spatial position.

3. A counterbalanced, spatially adjustable article supporting device comprising:

a rigid, tubular encasement having an aperture in one side wall;

pivotal connector means coupled at each end of said encasement pivotal relative to said encasement;

rod disposed in said encasement;

a pair of linkage means, one coupled pivotally to said rod at each end, each of said linkage means coupled pivotally to said connector means;

compression force generating means connected to said rod for resisting movement of said rod in one direction; and compression force generating adjustment means connected to said compression force means disposed near said encasement aperture and accessible from outside said encasement.

4. A supporting device as in claim 3, including:

rod locking means connected to said encasement and to said rod for locking said rod in a fixed position to prevent relative movement of said rod and said encasement.

5. A supporting device, as in claim 4, wherein:

one of said linkage means includes a first linkage arm;

a clevis connected at one end to said first linkage arm; and a clevis bearing connected to said encasement and coupled moveably to said clevis, said clevis coupled to said rod at one end, said first linking arm pivotally coupled to one of said connector means.

6. A device as in claim 5, including:

a horizontally disposed arm connected at one end to one of said connecting means, said encasement being rotationally moveable relative to said horizontal arm.

* * * * *